US012126107B2

(12) United States Patent
Matsuoka

(10) Patent No.: US 12,126,107 B2
(45) Date of Patent: Oct. 22, 2024

(54) CONNECTOR

(71) Applicant: SUMITOMO WIRING SYSTEMS, LTD., Mie (JP)

(72) Inventor: Hiroyuki Matsuoka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 347 days.

(21) Appl. No.: 17/745,631

(22) Filed: May 16, 2022

(65) Prior Publication Data

US 2022/0384977 A1 Dec. 1, 2022

(30) Foreign Application Priority Data

May 28, 2021 (JP) ................................ 2021-090451

(51) Int. Cl.

| | |
|---|---|
| ***H01R 13/631*** | (2006.01) |
| ***H01R 4/18*** | (2006.01) |
| ***H01R 13/405*** | (2006.01) |
| ***H01R 13/516*** | (2006.01) |
| ***H01R 13/639*** | (2006.01) |

(52) U.S. Cl.

CPC ............ *H01R 13/405* (2013.01); *H01R 4/18* (2013.01); *H01R 13/516* (2013.01); *H01R 13/6315* (2013.01); *H01R 13/639* (2013.01)

(58) Field of Classification Search

USPC ........................................ 439/247, 248, 252

See application file for complete search history.

(56) References Cited

U.S. PATENT DOCUMENTS

| | | | | |
|---|---|---|---|---|
| 9,831,584 | B2 * | 11/2017 | Singhammer | H01R 12/91 |
| 11,329,427 | B2 * | 5/2022 | Ichikawa | H01R 13/6273 |
| 11,329,431 | B2 * | 5/2022 | Pao | H01R 13/6315 |
| 2020/0161801 | A1 * | 5/2020 | Chiba | H01R 13/114 |

FOREIGN PATENT DOCUMENTS

| | | |
|---|---|---|
| JP | 2018-113119 A | 7/2018 |

* cited by examiner

*Primary Examiner* — Ross N Gushi

(74) *Attorney, Agent, or Firm* — Venjuris, P.C.

(57) ABSTRACT

A connector is provided with a flexible wire, a terminal to be connected to the wire, and a housing for accommodating the wire and the terminal. The housing includes a housing body for accommodating the wire and a holder for accommodating and holding the terminal. The holder is configured to be swingable in a plane direction together with the terminal with respect to the housing body by being attached to the housing body with a play between the housing body and the holder. The wire extends to the outside of the housing body in an extending direction intersecting a Z-axis direction and is slidable in the extending direction with respect to the housing body, following a swinging motion of the terminal. A gap for allowing the wire to be bent, following a swinging motion of the terminal, is provided between the housing body and the wire.

9 Claims, 15 Drawing Sheets

CONNECTOR

CROSS-REFERENCE TO RELATED APPLICATIONS

This application is based on and claims priority from Japanese Patent Application No. 2021-090451, filed on May 28, 2021, with the Japan Patent Office, the disclosure of which is incorporated herein in its entirety by reference.

TECHNICAL FIELD

The present disclosure relates to a connector.

BACKGROUND

Conventionally, a connector is known which is connected to a device for vehicle or the like (see, for example, Japanese Patent Laid-open Publication No. 2018-113119). A connector described in Japanese Patent Laid-open Publication No. 2018-113119 includes a terminal, a wire to be connected to the terminal and a shield shell for covering the terminal and the wire.

The terminal extends in a connecting direction of a device and the connector. The wire extends to the outside of the shield shell in a direction orthogonal to the connecting direction. An insulating resin portion is provided between the terminal and the shield shell and between the wire and the shield shell. The terminal, the wire and the shield shell are integrated by the insulating resin portion.

SUMMARY

In the connector described in Japanese Patent Laid-open Publication No. 2018-113119, the terminal and the shield shell are integrated by the insulating resin portion. Thus, if the positions of a connection object to be connected to the connector and the connector deviate from proper positions, an operation of connecting the connection object and the connector may become difficult.

The present disclosure aims to provide a connector enabling an easy connecting operation of a connection object and the connector.

The present disclosure is directed to a connector to be connected to a connection object, the connector including a flexible wire, a terminal to be connected to the wire, and a housing for accommodating the wire and the terminal, wherein, when a direction of connection of the connector to the connection object is a connecting direction and a direction along a virtual plane orthogonal to the connecting direction is a plane direction, the housing includes a housing body for accommodating the wire and a holder for accommodating and holding the terminal, the holder is configured to be swingable in the plane direction together with the terminal with respect to the housing body by being attached to the housing body with a play between the housing body and the holder, the wire extends to outside of the housing body in an extending direction intersecting the connecting direction and slidable in the extending direction with respect to the housing body, following a swinging motion of the terminal, and a gap for allowing the wire to be bent, following a swinging motion of the terminal, is provided between the housing body and the wire.

According to the present disclosure, a connecting operation of a connection object and a connector can be easily performed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
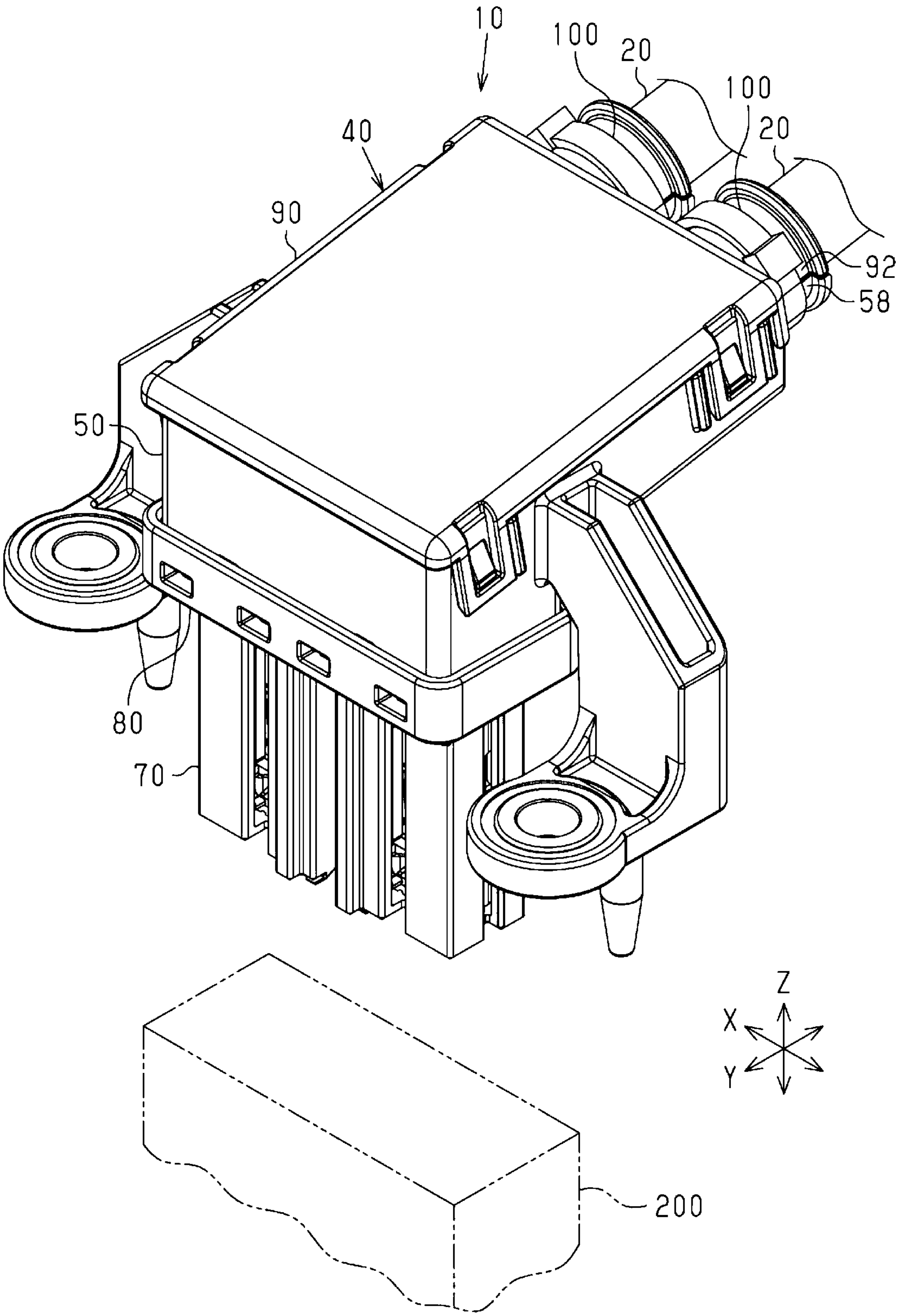
FIG. 1 is a perspective view of a connector of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

SUMMARY OF EMBODIMENTS

[1] The connector of the present disclosure is a connector to be connected to a connection object and includes a flexible wire, a terminal to be connected to the wire, and a housing for accommodating the wire and the terminal, wherein, when a direction of connection of the connector to the connection object is a connecting direction and a direction along a virtual plane orthogonal to the connecting direction is a plane direction, the housing includes a housing body for accommodating the wire and a holder for accommodating and holding the terminal, the holder is configured to be swingable in the plane direction together with the terminal with respect to the housing body by being attached to the housing body with a play between the housing body and the holder, the wire extends to outside of the housing body in an extending direction intersecting the connecting direction and is slidable in the extending direction with respect to the housing body, following a swinging motion of the terminal, and a gap for allowing the wire to be bent, following a swinging motion of the terminal, is provided between the housing body and the wire.

According to this configuration, the holder for holding the terminal is configured to be swingable in the plane direction with respect to the housing body. The wire is bendable and slidable in the extending direction, following a swinging motion of the terminal with respect to the housing body, inside the housing body. From these, the terminal and the holder integrally swing in the plane direction with respect to the housing body, thereby absorbing positional deviations of the connection object and the connector. Therefore, a connecting operation of the connection object and the connector can be easily performed.

[2] Preferably, the terminal includes a first extending portion to be electrically connected to the connection object and extending in the connecting direction, a second extending portion to be electrically connected to the wire and extending in the extending direction, and a bent portion located between the first extending portion and the second extending portion.

According to this configuration, the terminal includes the first extending portion extending in the connecting direction, the second extending portion extending in the extending direction of the wire and the bent portion. Since the wire is connected to such a second extending portion, the extending direction of the wire can be made different from the connecting direction without bending the wire. In this way, it can be suppressed that the wire is accommodated in a bent state inside the housing body. Therefore, it can be suppressed that a load is generated in the wire.

[3] Preferably, the housing body includes a first accommodating portion provided with the gap and a second accommodating portion for supporting the wire slidably in the extending direction, and the second accommodating portion is provided at a position more away from the holder than the first accommodating portion.

According to this configuration, the wire is bendable inside the first accommodating portion and slidable inside the second accommodating portion. Such a second accommodating portion is provided at the position more away from the holder than the first accommodating portion. Thus, if an external force is applied to a part extending to the outside of the housing, out of the wire, the rattling of the wire inside the first accommodating portion can be suppressed. Therefore, the transmission of the above external force to the terminal and the holder can be suppressed.

[4] Preferably, the second accommodating portion includes a supporting protrusion projecting toward the wire from an inner surface of the second accommodating portion and configured to support the wire slidably in the extending direction.

According to this configuration, the wire is supported slidably in the extending direction inside the second accommodating portion by the supporting protrusion. Since the supporting protrusion projects toward the wire from the inner surface of the second accommodating portion, the outer surface of the wire is partially supported by the supporting protrusion. Thus, an increase in the contact area of the second accommodating portion and the wire can be suppressed. This enables the wire to smoothly slide in the extending direction inside the second accommodating portion. Therefore, the terminal and the holder can be smoothly swung with respect to the housing body.

[5] Preferably, the housing body includes an insertion opening open on a side opposite to the holder in the connecting direction and configured to enable insertion of the wire therethrough, and the housing includes a cover for covering the insertion opening by being mounted on the housing body.

According to this configuration, the wire can be accommodated in the housing body by mounting the cover on the housing body after the wire is arranged inside the housing body through the insertion opening. Therefore, the connector can be easily assembled.

[6] Preferably, the housing includes a retainer to be mounted on an outer surface of the housing body, the housing body includes an insertion portion open in the connecting direction and configured such that the holder is inserted thereinto, a cut is provided on an opening edge of the insertion portion, the holder includes a projection to be inserted into the cut with a play between the cut and the projection, and the retainer includes a restricting portion for closing the cut and restricting separation of the projection from the cut by contacting the opening edge.

According to this configuration, the separation of the holder from the housing body is restricted by mounting the retainer on the outer surface of the housing body with the projection of the holder inserted in the cut of the housing body. In this way, the holder configured to be swingable with respect to the housing body can be easily realized.

[7] Preferably, the connector includes a plurality of the terminals, and a plurality of the wires to be respectively connected to the terminals, and the holder is configured to collectively hold the plurality of terminals and be swingable in the plane direction together with the plurality of terminals with respect to the housing body.

According to this configuration, the plurality of terminals are collectively held in the holder. Thus, changes in relative positions of the terminals can be suppressed inside the holder. Therefore, the plurality of terminals can be easily connected to the connection object.

[8] Preferably, the plurality of wires are arranged in an arrangement direction orthogonal to both the connecting direction and the extending direction inside the housing body.

According to this configuration, an increase in the size of the connector in the connecting direction can be suppressed as compared to the case where the plurality of wires extend in a direction intersecting the connecting direction and are arranged in the connecting direction.

[9] Preferably, the connector constitutes a device together with a case of the device by being fixed to the case, the housing body includes a fixing portion to be fixed to the case, and the fixing portion includes a bolt hole penetrating through the fixing portion in the connecting direction.

According to this configuration, the bolt hole of the fixing portion penetrates through the fixing portion in the connecting direction orthogonal to the arrangement direction of the plurality of wires. Thus, an increase in the size of the fixing portion in the connecting direction can be suppressed, for example, as compared to the case where the bolt hole penetrates through the fixing portion in the arrangement direction. Therefore, an increase in the size of the connector in the connecting direction can be suppressed.

DETAILS OF EMBODIMENT OF PRESENT DISCLOSURE

A specific example of a connector of the present disclosure is described below with reference to the drawings. In each figure, some of components may be shown in an exaggerated or simplified manner for the convenience of description. Further, a dimension ratio of each part may be different in each figure. Note that the present disclosure is not limited to these illustrations and is intended to be represented by claims and include all changes in the scope of claims and in the meaning and scope of equivalents. “Orthogonal” in this specification means not only strictly orthogonal, but also substantially orthogonal within a range in which functions and effects in this embodiment are achieved.

(Configuration of Connector 10)

As shown in FIG. 1, a connector 10 is, for example, electrically connected to a mating connector 200 serving as a connection object. The connector 10 is fixed to a part (see FIG. 5) of a case 110 of a device to constitute the device together with the case 110.

Figure 2:
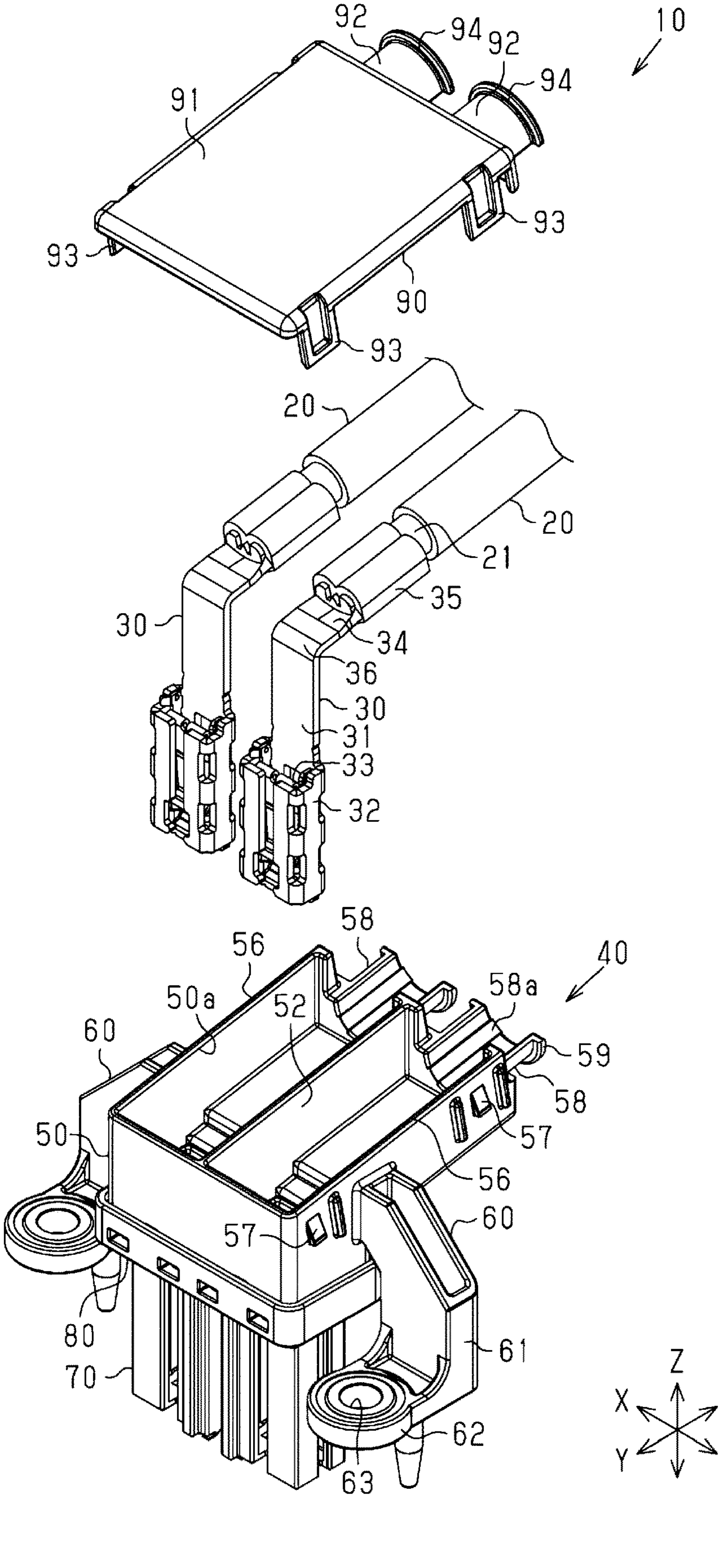
FIG. 2 is an exploded perspective view of the connector.

As shown in FIG. 2, the connector 10 includes a plurality of wires 20, a plurality of terminals 30 and a housing 40. The connector 10 of this embodiment includes two wires 20 and two terminals 30.

The housing 40 accommodates the plurality of wires 20 and the plurality of terminals 30. The plurality of wires 20 are parallel to each other. The wires 20 extend to the outside of the housing 40. The terminals 30 are electrically connected to the wires 20.

In each figure, out of XYZ axes orthogonal to each other, the X axis is along an arrangement direction of the plurality of wires 20. Further, the Z axis is along a connecting direction of the mating connector 200 and the connector 10. In the following description, directions along the X, Y and Z axes are respectively referred to as an X-axis direction, a Y-axis direction and a Z-axis direction. Further, a direction along a virtual plane orthogonal to the Z-axis direction is referred to as a plane direction. Note that this virtual plane can be paraphrased as an XY plane.

(Configuration of Wires 20)

Figure 3:
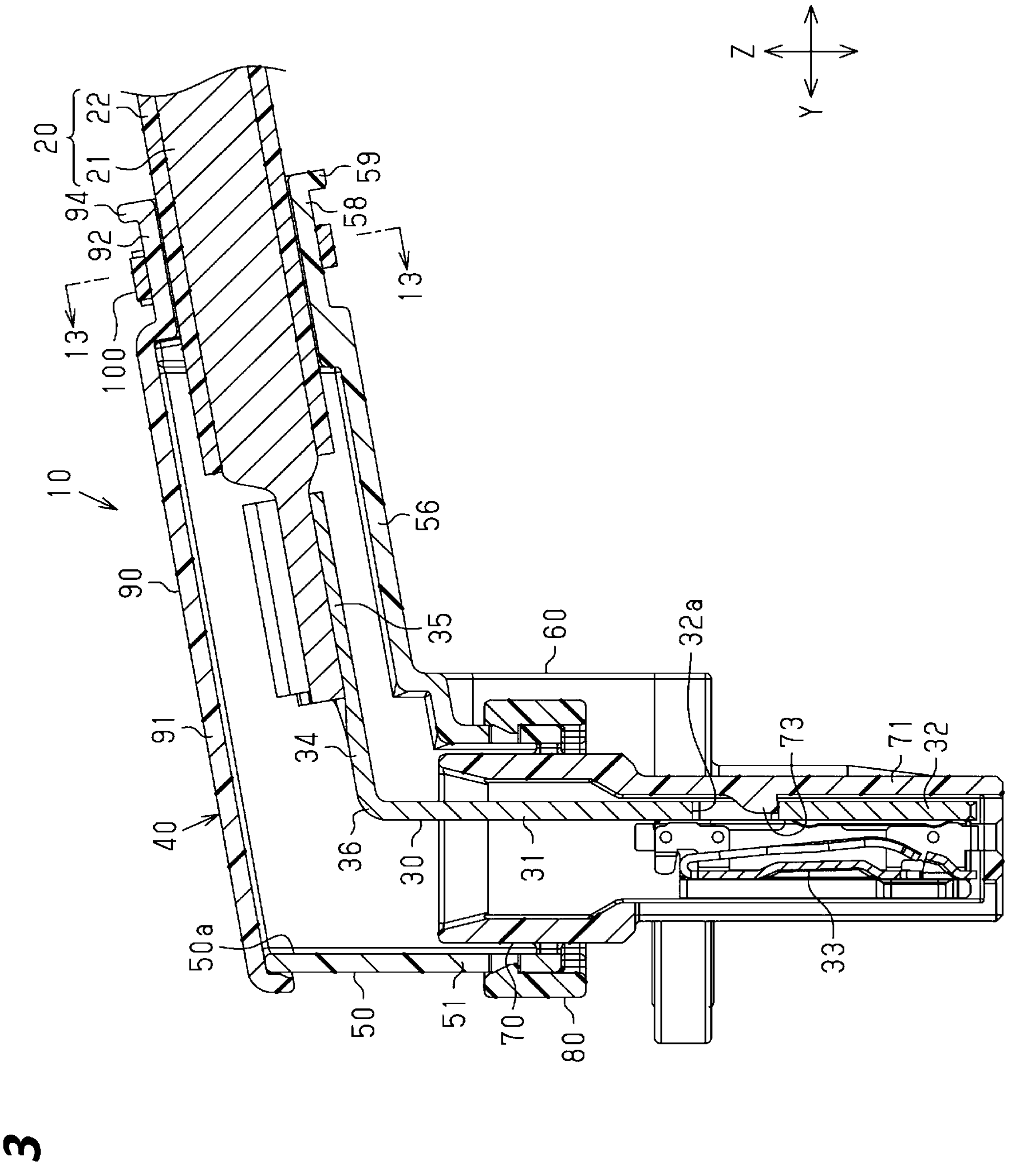
FIG. 3 is a section of the connector.

As shown in FIG. 3, the wire 20 extends to the outside of the housing 40 in a direction intersecting the Z-axis direction in a YZ plane. In other words, the wire 20 extends more away from the housing 40 in the Y-axis direction with distance from the housing 40 in the Z-axis direction. A direction in which the wire 20 extends is referred to as an extending direction below.

The wire 20 includes a core 21 formed of a conductor and an insulation coating 22 covering the outer periphery of the core 21. The wire 20 is flexible and configured to be bendable.

The core 21 is, for example, a stranded wire formed by twisting a plurality of metal strands. The core 21 is exposed from the insulation coating 22 in an end part of the wire 20. The core 21 exposed from the insulation coating 22 is electrically connected to the terminal 30.

A cross-sectional shape of the core 21 can be an arbitrary shape. The cross-sectional shape of the core 21 can be, for example, a circular shape, semicircular shape, polygonal shape, square shape or flat shape. The cross-sectional shape of the core 21 of this embodiment is a circular shape. Therefore, a cross-sectional shape of the wire 20 of this embodiment is circular.

A copper-based or aluminum-based metal material can be, for example, used as a material of the core 21.

A resin material mainly containing a polyolefin-based resin such as cross-linked polyethylene or cross-linked polypropylene can be, for example, used as a material of the insulation coating 22.

(Configuration of Terminals 30)

As shown in FIGS. 2 and 3, the terminal 30 includes a first extending portion 31, a second extending portion 34 and a bent portion 36. The terminal 30 is, for example, formed by bending a metal plate material. An iron-based, copper-based or aluminum-based metal material can be, for example, used as a material of the terminal 30.

The first extending portion 31 extends in the Z-axis direction. The first extending portion 31 includes a connecting portion 32 to be electrically connected to an unillustrated mating terminal provided in the mating connector 200.

The connecting portion 32 is tubular to enable the insertion of the mating terminal thereinto. A spring member 33 is accommodated inside the connecting portion 32. The mating terminal and the terminal 30 are electrically connected by pressing the mating terminal toward the inner surface of the connecting portion 32 by the spring member 33.

As shown in FIG. 3, the connecting portion 32 is provided with a recess **32*a* to be engaged with a locking lance 73 of a holder 70 to be described later. The recess 32*a* penetrates through the connecting portion 32** in the Y-axis direction.

The second extending portion 34 extends in the extending direction. The second extending portion 34 extends obliquely with respect to the first extending portion 31 to be separated more from the first extending portion 31 in the Y-axis direction with distance from the first extending portion 31 in the Z-axis direction. An angle formed between the first and second extending portions 31, 34 is, for example, 100°. Therefore, an angle formed between the Z-axis direction, which is the connecting direction in the connector 10, and the extending direction of the wire 20 is 100° in this embodiment.

The second extending portion 34 includes a wire connecting portion 35 to be electrically connected to the wire 20. The wire connecting portion 35 is crimped to the core 21 exposed from the insulation coating 22.

The bent portion 36 is located between the first and second extending portions 31, 34. The bent portion 36 couples the first and second extending portions 31, 34.

(Configuration of Housing 40)

As shown in FIGS. 1 and 2, the housing 40 includes a housing body 50, the holder 70, a retainer 80 and a cover 90. The housing 40 is, for example, formed of a resin material. The housing 40 is shaped plane-symmetrically with respect to a YZ plane as a plane of symmetry.

As shown in FIGS. 2 and 3, the wires 20 and the terminals 30 are accommodated inside the housing body 50. The holder 70 is configured to be swingable in the plane direction with respect to the housing body 50 by being attached to the housing body 50 with a play between the holder 70 and the housing body 50. The housing body 50 includes an insertion opening **50*a* open on a side opposite to the holder 70 in the Z-axis direction and configured such that the wires 20 and the terminals 30 are insertable therethrough. The retainer 80 is mounted on the outer surface of the housing body 50 to restrict the separation of the holder 70 from the housing body 50. The cover 90 is mounted on the housing body 50 to cover the insertion opening 50*a***.

(Configuration of Housing Body 50)

Figure 4:
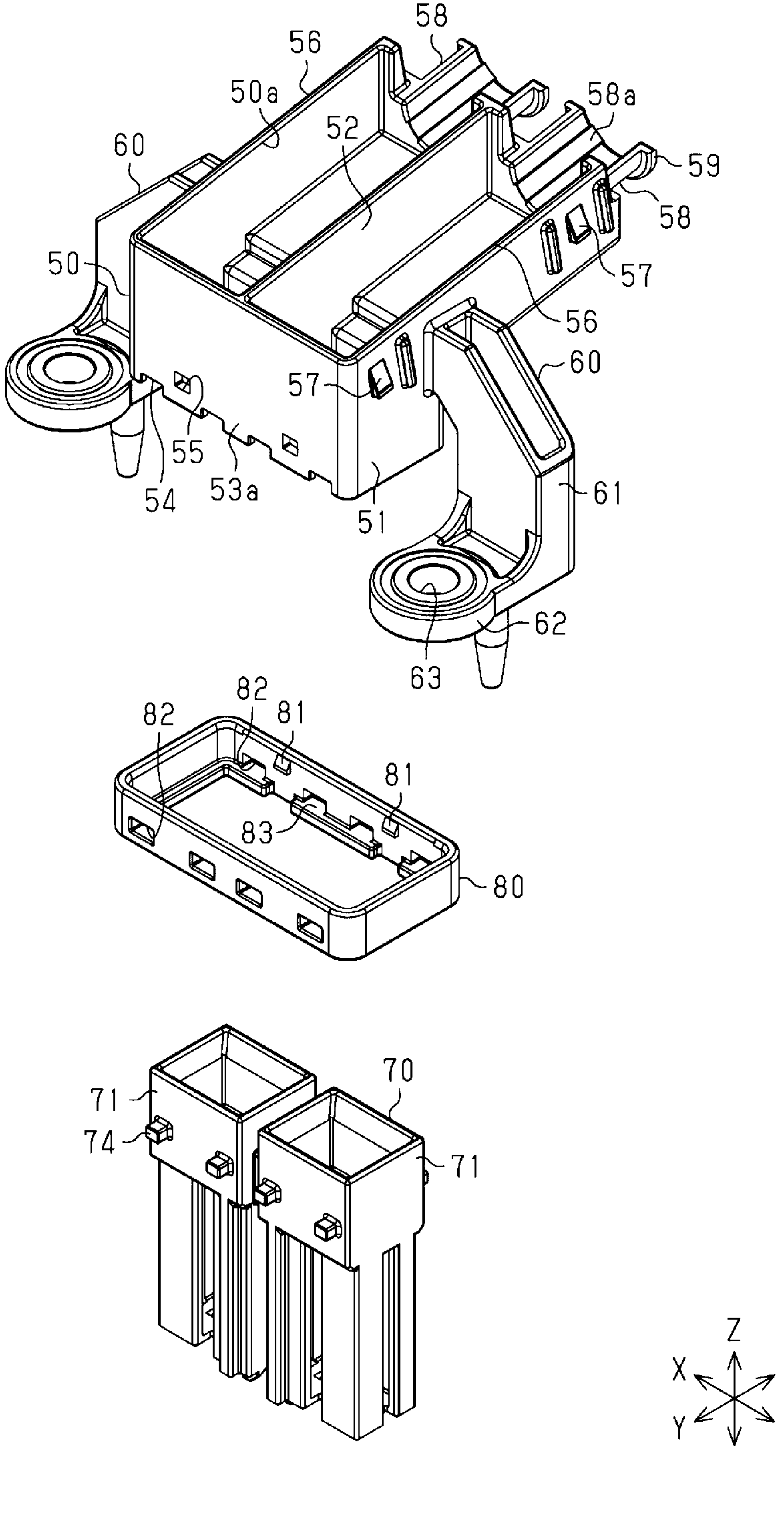
FIG. 4 is an exploded perspective view of a housing.

As shown in FIG. 4, the housing body 50 includes one insertion portion 51, a plurality of first accommodating portions 56, a plurality of second accommodating portions 58 and a plurality of fixing portions 60. The housing body 50 of this embodiment includes two first accommodating portions 56, two second accommodating portions 58 and two fixing portions 60.

As shown in FIG. 3, the insertion portion 51 extends in the Z-axis direction. The holder 70 and the first extending portions 31 of the terminals 30 are inserted into the insertion portion 51.

The first accommodating portion 56 extends in the extending direction from the insertion portion 51. The second extending portion 34 of the terminal 30 and the wire 20 are accommodated into the first accommodating portion 56.

The second accommodating portion 58 extends in the extending direction from the first accommodating portion 56. The wire 20 is accommodated into the second accommodating portion 58.

Figure 5:
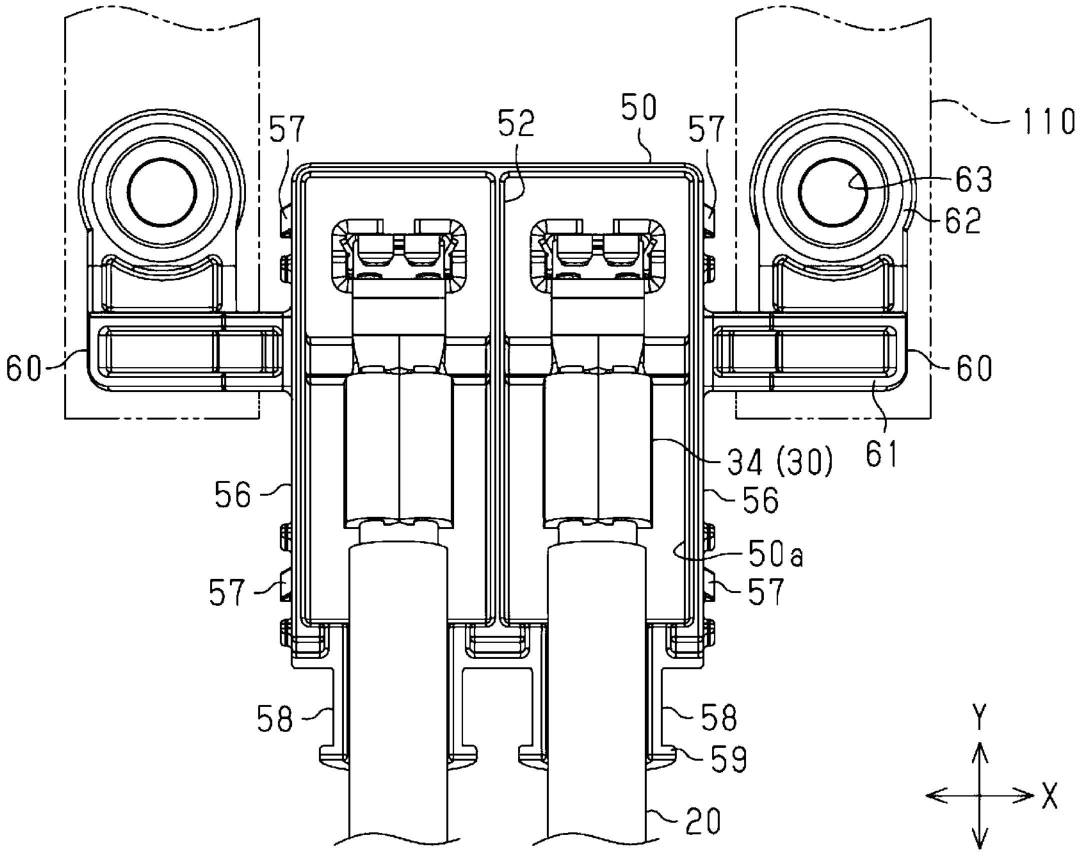
FIG. 5 is a plan view of a housing body.

As shown in FIG. 5, the housing body 50 includes a partition wall 52 partitioning the inside of the housing body 50 into two sections. By the partition wall 52, the inside of the housing body 50 is separated into the two first accommodating portions 56 and the two second accommodating portions 58. Therefore, the two first accommodating portions 56 are provided adjacent to each other in the X-axis direction. Further, the two second accommodating portions 58 are provided adjacent to each other in the X-axis direction.

(Configuration of Insertion Portion 51)

Figure 6:
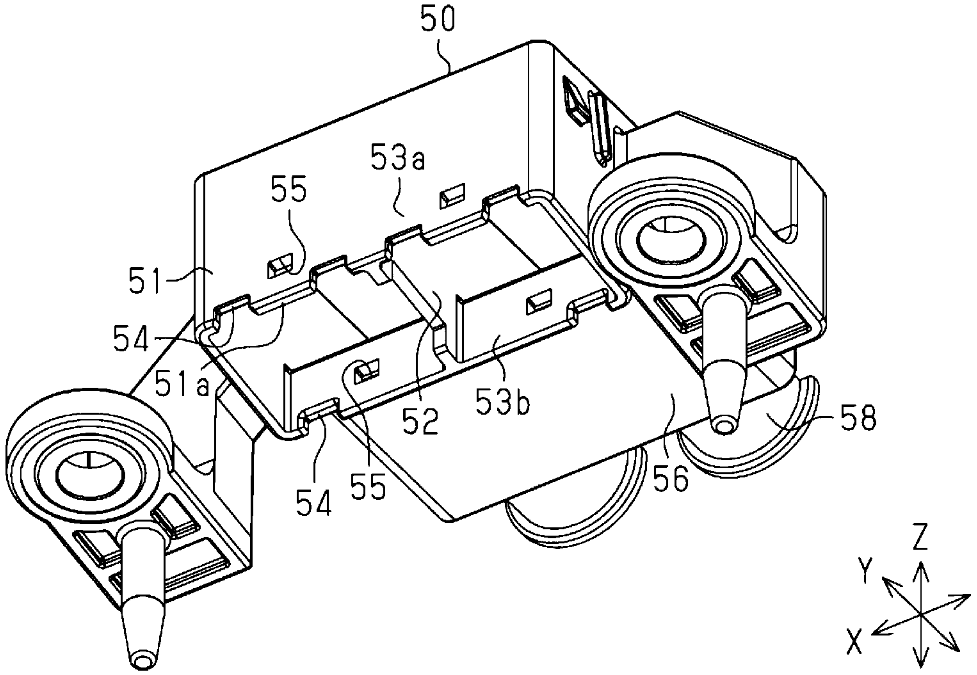
FIG. 6 is a perspective view of the housing body.

As shown in FIG. 6, the insertion portion 51 is open in the Z-axis direction. The inside of the insertion portion 51 is partitioned into two sections by the partition wall 52.

The insertion portion 51 has two facing walls 53*a*, 53*b* facing each other in the Y-axis direction. The facing wall 53*a* is provided at a position more away from the second accommodating portions 58 than the facing wall 53*b* in the Y-axis direction.

A plurality of cuts 54 are provided on an opening edge 51*a* of the insertion portion 51 while being spaced apart from each other in the X-axis direction. The plurality of cuts 54 are provided in the respective facing walls 53*a*, 53*b*. The cuts 54 penetrate through the facing walls 53*a*, 53*b* in the Y-axis direction.

Two cuts are provided on each of both sides across the partition wall 52 in the X-axis direction in the facing wall 53*a*. One cut is provided on each of both sides across the partition wall 52 in the X-axis direction in the facing wall 53*b*. Two cuts 54 of the facing wall 53*b* and the cuts 54 on both sides in the X-axis direction of the facing wall 53*a* are facing each other in the Y-axis direction.

A plurality of engaging recesses 55 are provided in each facing wall 53*a*, 53*b* while being spaced apart in the X-axis direction. The engaging recesses 55 penetrate through the facing walls 53*a*, 53*b* in the Y-axis direction.

One engaging recess 55 is provided on each of both sides across the partition wall 52 in the X-axis direction in each facing wall 53*a*, 53*b*. Two engaging recesses 55 of the facing wall 53*a* and two engaging recesses 55 of the facing wall 53*b* are facing each other in the Y-axis direction.

(Configuration of First Accommodating Portions 56)

As shown in FIG. 4, the first accommodating portion 56 is open on a side opposite to the holder 70 in the Z-axis direction. A cross-sectional shape of the first accommodating portion 56 perpendicular to the extending direction is, for example, a gutter-like shape. An opening of the first accommodating portion 56 constitutes a part of the insertion opening 50*a* of the housing body 50 described above.

As shown in FIGS. 3 and 5, widths of the first accommodating portion 56 in the X-axis direction and Z-axis direction are respectively larger than a diameter of the wire 20. Further, the widths of the first accommodating portion 56 in the X-axis direction and Z-axis direction are respectively larger than those of the second extending portion 34 in the X-axis direction and Z-axis direction. From the above, gaps are provided between the wire 20 and the first accommodating portion 56 and between the terminal 30 and the first accommodating portion 56 in both the X-axis direction and the Z-axis direction. The wire 20 is allowed to be bent inside the first accommodating portion 56 by these gaps.

As shown in FIGS. 4 and 5, two engaging projections 57 are provided on the outer surface in the X-axis direction of each first accommodating portion 56 while being spaced apart in the Y-axis direction. Therefore, the housing body 50 is provided with four engaging projections 57.

(Configuration of Second Accommodating Portions 58)

As shown in FIG. 4, the second accommodating portion 58 is open on a side opposite to the holder 70 in the Z-axis direction. A cross-sectional shape of the second accommodating portion 58 perpendicular to the extending direction is, for example, an arcuate shape along the outer peripheral surface of the wire 20. An opening of the second accommodating portion 58 constitutes a part of the insertion opening 50*a* of the housing body 50 described above. Note that the insertion opening 50*a* is constituted by the openings of the first accommodating portions 56 and the openings of the second accommodating portions 58.

As shown in FIGS. 3 and 5, the second accommodating portion 58 is provided continuously with the first accommodating portion 56 in the extending direction. The second accommodating portion 58 is provided at a position more away from the holder 70 than the first accommodating portion 56. The second accommodating portion 58 constitutes an end part in the extending direction of the housing body 50. Therefore, the wire 20 extends to the outside of the housing body 50 from the second accommodating portion 58.

Widths of the second accommodating portion 58 in the X-axis direction and Z-axis direction are respectively smaller than those of the first accommodating portion 56 in the X-axis direction and Z-axis direction.

As shown in FIG. 4, the second accommodating portion 58 includes a plurality of supporting protrusions 58*a* projecting toward the wire 20 from the inner surface of the second accommodating portion 58 and configured to support the wire 20 slidably in the extending direction. The plurality of supporting protrusions 58*a* are provided while being spaced apart from each other in a circumferential direction of the wire 20. Each second accommodating portion 58 of this embodiment includes two supporting protrusions 58*a*.

The supporting protrusion 58*a* extends over the entire second accommodating portion 58 in the extending direction. The projecting end surface of the supporting protrusion 58*a* is arcuately curved along the outer peripheral surface of the wire 20. The wire 20 is slidable in the extending direction with respect to the housing body 50 by being partially supported by the supporting protrusions 58*a* inside the second accommodating portion 58.

An arcuate retaining portion 59 projecting toward an outer peripheral side is provided on an end edge of the second accommodating portion 58 on a side opposite to the first accommodating portion 56 in the extending direction.

(Configuration of Fixing Portions 60)

As shown in FIG. 4, the fixing portion 60 includes a first part 61 and a second part 62.

The first part 61 projects in the X-axis direction from the outer surface of the first accommodating portion 56 and is bent to extend in the Z-axis direction. The first part 61 extends in a direction from the insertion portion 51 toward the holder 70 along the Z-axis direction.

The second part 62 extends from the first part 61 toward a side opposite to the second accommodating portion 58 in the Y-axis direction. The second part 62 includes a bolt hole 63 penetrating therethrough in the Z-axis direction.

As shown in FIG. 5, the fixing portion 60 is fixed to the case 110 of the device by an unillustrated bolt inserted into the bolt hole 63. Therefore, in this embodiment, a mounting direction of the connector 10 on the case 110 coincides with the Z-axis direction, which is the connecting direction in the connector 10.

(Configuration of Holder 70)

Figure 7:
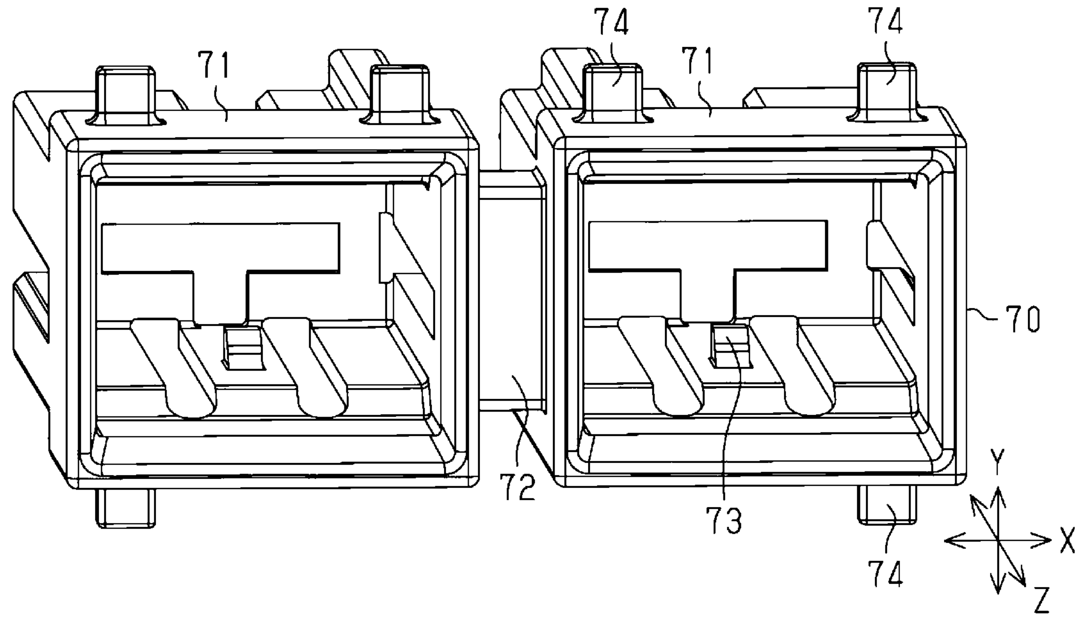
FIG. 7 is a perspective view of a holder.

As shown in FIG. 7, the holder 70 includes a plurality of terminal accommodating portions 71 for accommodating the first extending portions 31 of the terminals 30 and a coupling portion 72 coupling the terminal accommodating portions 71. The holder 70 of this embodiment includes two terminal accommodating portions 71.

The locking lance 73 to be engaged with the recess 32*a* of the terminal 30 is provided inside the terminal accommodating portion 71. The locking lance 73 projects from the inner surface of the terminal accommodating portion 71 toward the terminal 30 in the Y-axis direction. By the engagement of the locking lance 73 with the recess 32*a*, the terminal 30 is held in the terminal accommodating portion 71. The holder 70 collectively holds the two terminals 30 accommodated in the two terminal accommodating portions 71.

As shown in FIGS. 4 and 7, the holder 70 includes a plurality of projections 74 to be inserted into the cuts 54 of the housing body 50. The projection 74 projects in the Y-axis direction from a part facing the cut 54, out of the outer surface of the terminal accommodating portion 71. More particularly, two projections 74 are provided in a part facing the facing wall 53*a* in each terminal accommodating portion 71. One projection 74 is provided in a part facing the facing wall 53*b* in each terminal accommodating portion 71. Therefore, the holder 70 includes six projections 74.

Figure 8:
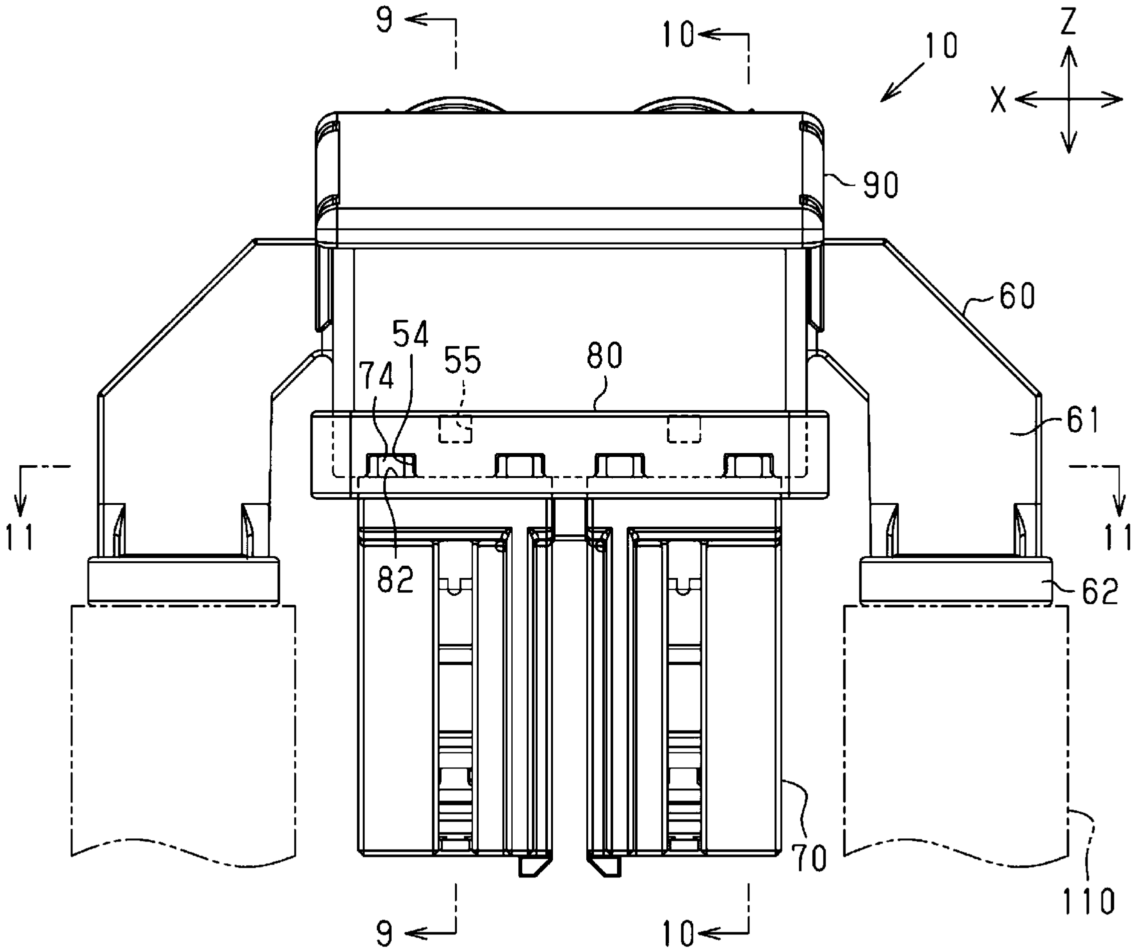
FIG. 8 is a front view of the connector.

As shown in FIG. 8, a width in the X-axis direction of the projection 74 is smaller than that in the X-axis direction of the cut 54. Therefore, the projection 74 is inserted into the cut 54 with a play between the projection 74 and the cut 54.

(Configuration of Retainer 80)

As shown in FIG. 4, the retainer 80 is in the form of a frame for surrounding the insertion portion 51 of the housing body 50. The retainer 80 is shaped plane symmetrically with respect to a YZ plane as a plane of symmetry and shaped plane symmetrically with respect to an XZ plane as a plane of symmetry.

The retainer 80 includes a plurality of engaging projections 81 and a plurality of through holes 82. The retainer 80 of this embodiment includes four engaging projections 81 and eight through holes 82.

Figure 9:
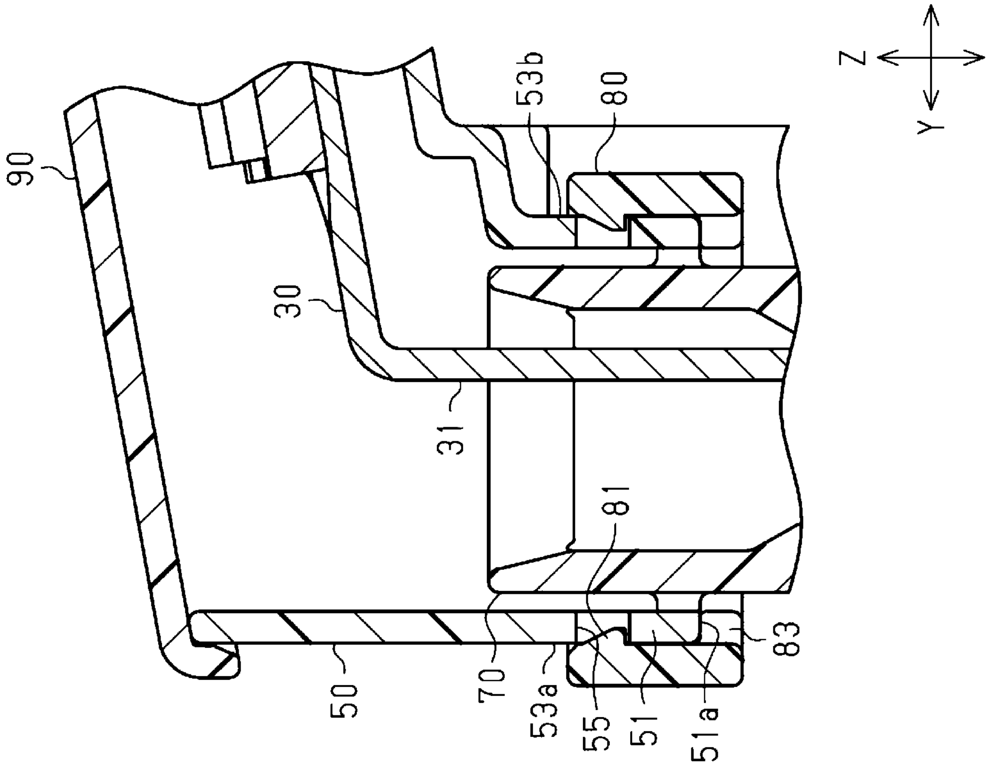
FIG. 9 is a section along 9-9 of FIG. 8.

As shown in FIG. 9, the engaging projection 81 projects in the Y-axis direction from a part facing the engaging recess 55 of the housing body 50, out of the inner surface of the retainer 80. The engaging projection 81 is engaged with the engaging recess 55. By the engagement of the engaging projections 81 with the engaging recesses 55, the retainer 80 is mounted on the housing body 50.

Figure 10:
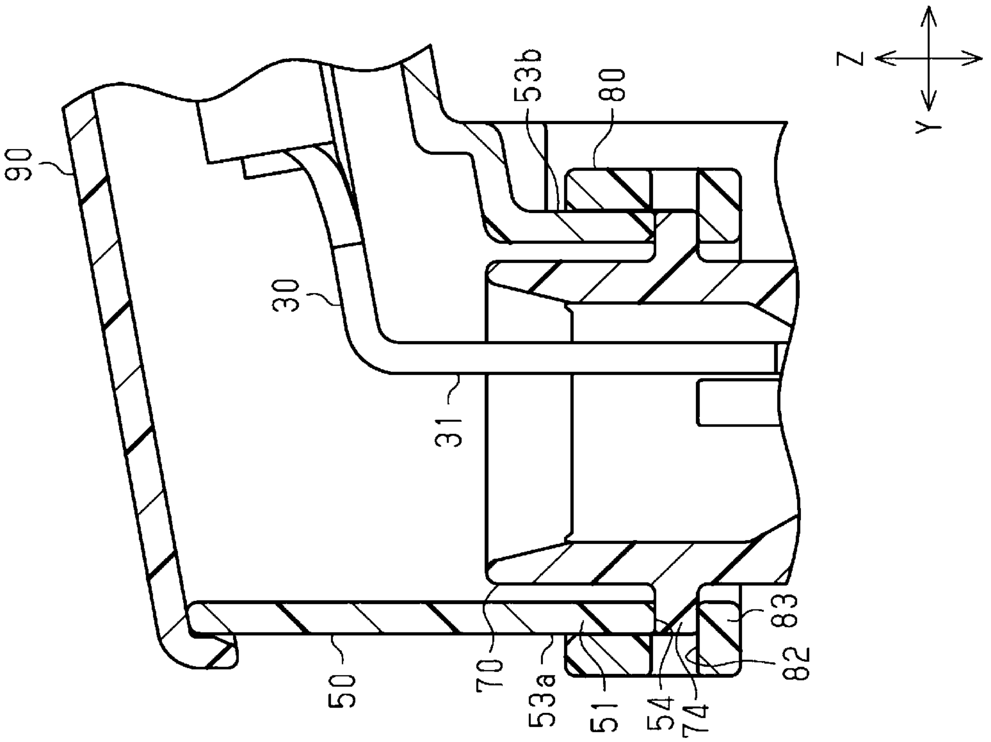
FIG. 10 is a section along 10-10 of FIG. 8.

As shown in FIGS. 4 and 10, four through holes 82 are provided in each of parts of the retainer 80 facing the facing walls 53*a*, 53*b*. The through holes 82 penetrate through the retainer 80 in the Y-axis direction.

Figure 11:
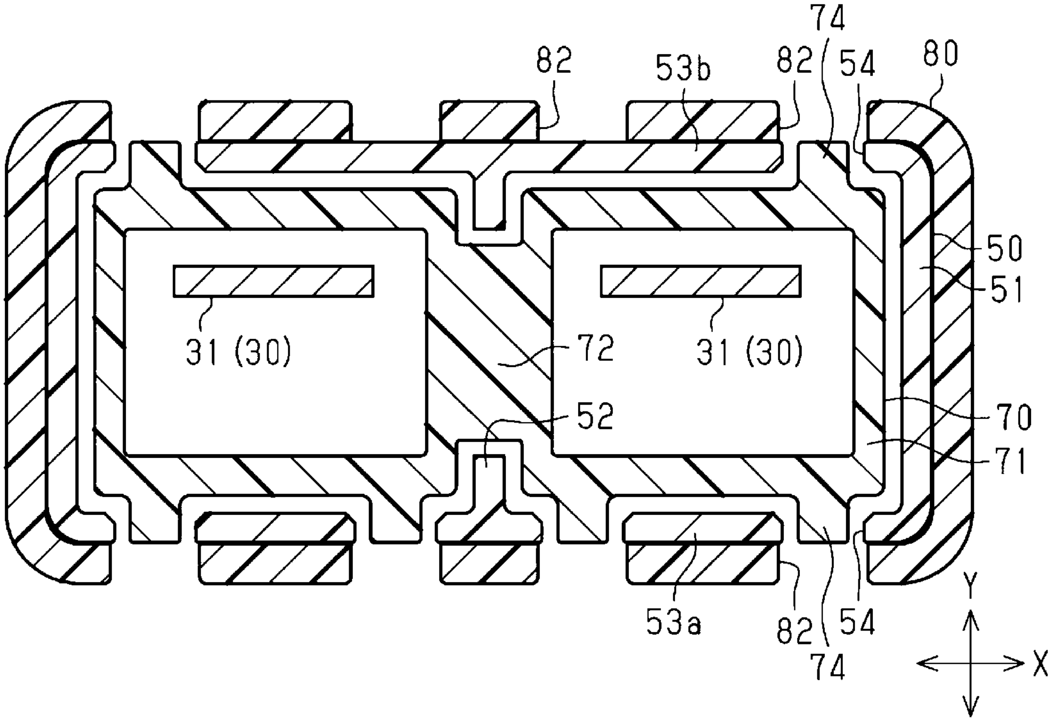
FIG. 11 is a section along 11-11 of FIG. 8.

As shown in FIG. 11, six through holes 82, out of the eight through holes 82, are provided at positions corresponding to the cuts 54 of the housing body 50 and the projections 74 of the holder 70. Therefore, these six through holes 82 communicate with the respective cuts 54 in the Y-axis direction.

The remaining two through holes 82, out of the eight through holes 82, are facing the facing wall 53*b* of the housing body 50. Note that the retainer 80 needs not necessarily be provided with these two through holes 82, but the versatility of the retainer 80 can be enhanced by providing these through holes 82. That is, even if the retainer 80 is inverted about the Z axis, the retainer 80 can be mounted on the housing body 50.

As shown in FIG. 4, a restricting portion 83 projecting toward an inner peripheral side is provided on one end edge of the retainer 80 in the Z-axis direction. The restricting portion 83 has a ring shape discontinuous in a circumferential direction of the retainer 80. The restricting portion 83 is discontinuous in parts facing the respective engaging projections 81 in the Z-axis direction.

As shown in FIG. 9, with the engaging projections 81 engaged with the engaging recesses 55, the restricting portion 83 is in contact with the opening edge 51*a* of the insertion portion 51. In this way, as shown in FIG. 10, the restricting portion 83 closes the cuts 54 in the Z-axis direction and restricts the separation of the projections 74 from the cuts 54. At this time, the restricting portion 83 is in contact with the projections 74 in the Z-axis direction. In this way, the projections 74 are sandwiched in the Z-axis direction by the cuts 54 and the restricting portion 83. Therefore, movements of the projections 74 in the Z-axis direction, i.e. a movement of the holder 70 in the Z-axis direction, are restricted.

(Configuration of Cover 90)

As shown in FIG. 2, the cover 90 includes a first cover portion 91 and two second cover portions 92. The first cover portion 91 collectively covers the openings of the respective first accommodating portions 56. The second cover portion 92 covers the opening of the second accommodating portion 58.

The first cover portion 91 is in the form of a flat plate. The first cover portion 91 is provided with a plurality of engaging portions 93 to be engaged with the engaging projections 57 of the housing body 50. The first cover portion 91 of this embodiment is provided with four engaging portions 93. By the engagement of the engaging portions 93 with the engaging projections 57, the cover 90 is mounted on the housing body 50.

As shown in FIG. 3, gaps are provided in the Z-axis direction between the first cover portion 91 and the wires 20 and between the first cover portion 91 and the terminals 30.

Figure 12:
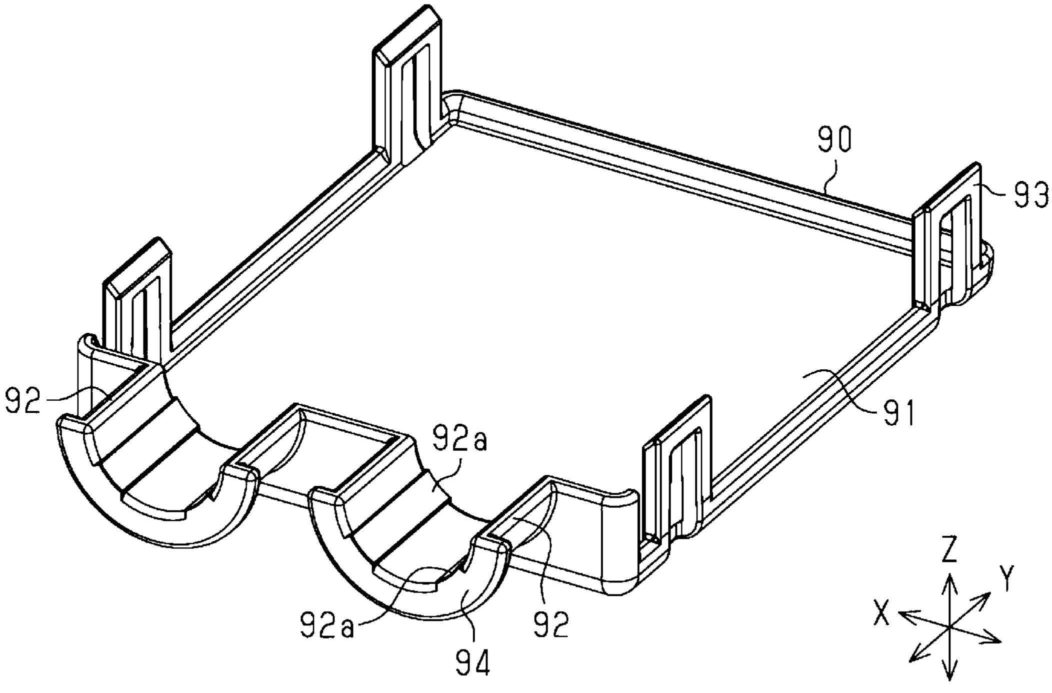
FIG. 12 is a perspective view of a cover.

As shown in FIG. 12, a cross-sectional shape of the second cover portion 92 perpendicular to the extending direction is an arcuate shape along the outer peripheral surface of the wire 20. The second cover portion 92 includes a plurality of supporting protrusions 92*a* projecting toward the wire 20 from the inner surface of the second cover portion 92 and configured to support the wire 20 slidably in the extending direction. The plurality of supporting protrusions 92*a* are provided while being spaced apart from each other in the circumferential direction of the wire 20. The second cover portion 92 of this embodiment includes two supporting protrusions 92*a*.

The supporting protrusion 92*a* extends over the entire second cover portion 92 in the extending direction. The projecting end surface of the supporting protrusion 92*a* is arcuately curved along the outer peripheral surface of the wire 20. The wire 20 is slidable in the extending direction with respect to the cover 90 by being partially supported by the supporting protrusions 92*a* inside the second cover portion 92.

Figure 13:
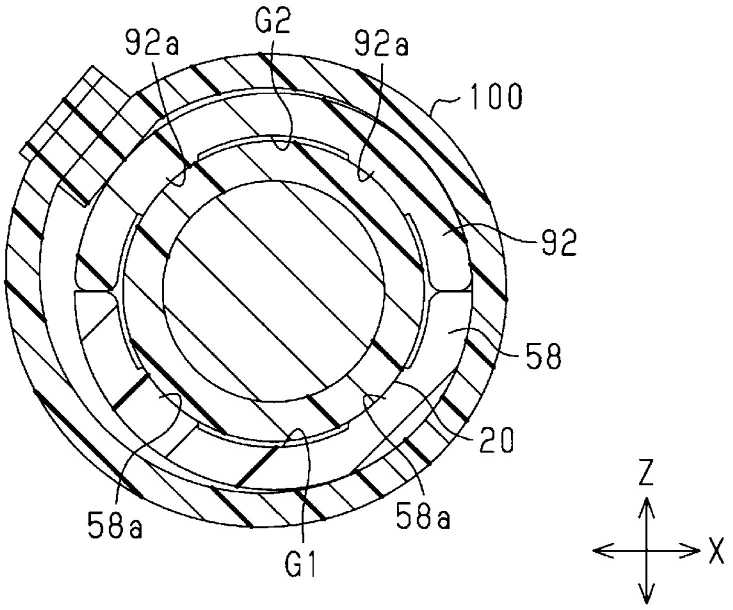
FIG. 13 is a section along 13-13 of FIG. 3.

As shown in FIG. 13, the wire 20 is partially supported by the supporting protrusions 58*a* of the second accommodating portion 58 and the supporting protrusions 92*a* of the second cover portion 92. In this embodiment, the wire 20 is partially supported in the circumferential direction of the wire 20 by the respective supporting protrusions 58*a*, 92*a*.

Thus, gaps G1 are partially provided between the second accommodating portion 58 and the wire 20. Similarly, gaps G2 are partially provided between the second cover portion 92 and the wire 20. The respective gaps G1, G2 are provided over the entire second accommodating portion 58 and second cover portion 92 in the extending direction.

As shown in FIG. 12, an arcuate retaining portion 94 projecting toward an outer peripheral side is provided on an end edge of the second cover portion 92 on a side opposite to the first cover portion 91 in the extending direction.

(Configuration of Band Members 100)

As shown in FIG. 1, the connector 10 includes two band members 100. The band member 100 is, for example, formed of a resin material.

As shown in FIG. 3, the band member 100 is collectively wound on the outer peripheries of the second accommodating portion 58 and the second cover portion 92 to fasten these. The second cover portion 92 is restricted from being deformed in a direction away from the second accommodating portion 58 by the band member 100.

The band member 100 is retained on the housing 40 by the respective restricting portion 59, 94.

(Swinging Mode of Holder 70)

As shown in FIG. 11, a gap is provided over the entire periphery between the holder 70 and the housing body 50 with the holder 70 mounted on the housing body 50. The holder 70 is configured to be swingable in the plane direction with respect to the housing body 50 in the range of the above gap. As described above, since each terminal 30 is held in the holder 70, the holder 70 is configured to be swingable in the plane direction together with the terminals 30 with respect to the housing body 50.

Figure 14:
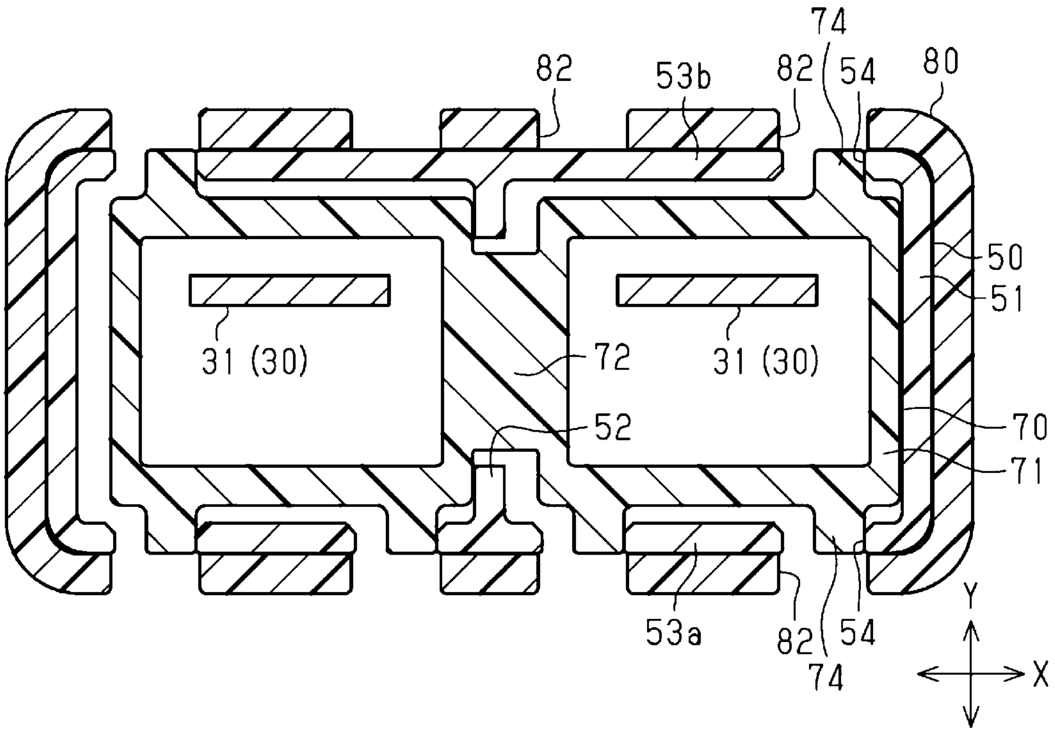
FIG. 14 is a section of the connector when the holder swings in an X-axis direction.

As shown in FIG. 14, if the holder 70 moves in the X-axis direction together with the respective terminals 30, the holder 70 contacts the inner surface of the insertion portion 51 in the X-axis direction. In this way, a swing range of the holder 70 in the X-axis direction is limited. As described above, the gaps are provided between the wires 20 and the first accommodating portions 56 and between the terminals 30 and the first accommodating portions 56. Thus, the wires 20 are bent inside the first accommodating portions 56, following swinging motions of the terminals 30 in the X-axis direction.

Figure 15:
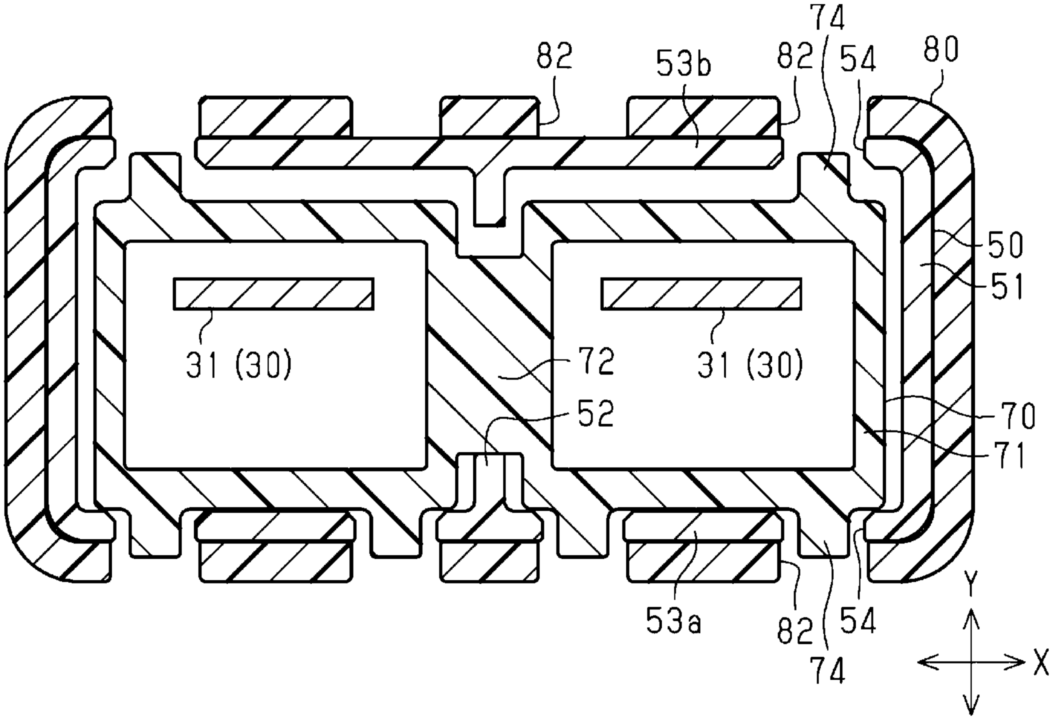
FIG. 15 is a section of the connector when the holder swings in a Y-axis direction.

As shown in FIG. 15, if the holder 70 swings in the Y-axis direction together with the respective terminals 30, the holder 70 contacts the inner surface of the insertion portion 51 in the Y-axis direction. In this way, a swing range of the holder 70 in the Y-axis direction is limited. As described above, the wires 20 are slidable in the extending direction with respect to the housing body 50 and the cover 90. Thus, the wires 20 slide in the extending direction with respect to the second accommodating portions 58 and the second cover portions 92, following swinging motions of the terminals 30 in the Y-axis direction.

Functions of this embodiment are described.

The holder 70 for holding the terminals 30 is configured to be swingable in the plane direction with respect to the housing body 50. The wires 20 are bendable and slidable in the extending direction, following swinging motions of the terminals 30 with respect to the housing body 50, inside the housing body 50. From these, positional deviations of the mating connector 200 and the connector 10 can be absorbed by the terminals 30 and the holder 70 integrally swinging in the plane direction with respect to the housing body 50.

Effects of this embodiment are described.

(1) The connector 10 includes the flexible wires 20, the terminals 30 to be connected to the wires 20 and the housing 40 for accommodating the wires 20 and the terminals 30. The housing 40 includes the housing body 50 for accommodating the wires 20 and the holder 70 for accommodating and holding the terminals 30. The holder 70 is attached to the housing body 50 with a play between the housing body 50 and the holder 70, thereby being swingable in the plane direction together with the terminals 30 with respect to the housing body 50. The wires 20 extend to the outside of the housing 40 in the extending direction intersecting the Z-axis direction and are slidable in the extending direction with respect to the housing body 50, following swinging motions of the terminals 30. The gaps for allowing the wires 20 to be bent, following the swinging motions of the terminals 30, are provided between the housing body 50 and the wires 20.

According to this configuration, since the above functions are achieved, a connecting operation of the mating connector 200 and the connector 10 can be easily performed.

(2) The terminal 30 includes the first extending portion 31 to be electrically connected to the mating connector 200 and extending in the Z-axis direction, the second extending portion 34 to be electrically connected to the wire 20 and extending in the extending direction, and the bent portion 36 located between the first and second extending portions 31, 34.

According to this configuration, the terminal 30 includes the first extending portion 31 extending in the Z-axis direction, the second extending portion 34 extending in the extending direction of the wire 20 and the bent portion 36. Since the wire 20 is connected to such a second extending portion 34, the extending direction of the wire 20 can be made different from the Z-axis direction without bending the wire 20. In this way, it can be suppressed that the wire 20 is accommodated in a bent state inside the housing body 50. Therefore, it can be suppressed that a load is generated in the wire 20.

(3) The housing body 50 includes the first accommodating portions 56 with the gaps for allowing the wires 20 to be bent, following swinging motions of the terminals 30, and the second accommodating portions 58 for supporting the wires 20 slidably in the extending direction. The second accommodating portions 58 are provided at positions more away from the holder 70 than the first accommodating portions 56.

According to this configuration, the wires 20 are bendable inside the first accommodating portions 56 and slidable inside the second accommodating portions 58. Such second accommodating portions 58 are provided at the positions more away from the holder 70 than the first accommodating portions 56. Thus, if an external force is applied to a part extending to the outside of the housing 40, out of the wire 20, the rattling of the wire 20 inside the first accommodating portion 56 can be suppressed. Therefore, the transmission of the above external force to the terminal 30 and the holder 70 can be suppressed.

(4) The second accommodating portion 58 includes the supporting protrusions **58*a* projecting toward the wire 20 from the inner surface of the second accommodating portion 58 and configured to support the wire 20** slidably in the extending direction.

According to this configuration, the wire 20 is supported slidably in the extending direction inside the second accommodating portion 58 by the supporting protrusions **58*a*. Since the supporting protrusions 58*a* project toward the wire 20 from the inner surface of the second accommodating portion 58, the outer surface of the wire 20 is partially supported by the supporting protrusions 58*a*. Thus, an increase in the contact area of the second accommodating portion 58 and the wire 20 can be suppressed. This enables the wire 20 to smoothly slide in the extending direction inside the second accommodating portion 58. Therefore, the terminal 30 and the holder 70 can be smoothly swung with respect to the housing body 50**.

(5) The housing body 50 includes the insertion opening 50*a* open on the side opposite to the holder 70 in the Z-axis direction and configured to enable the insertion of the wires 20 thereinto. The housing 40 includes the cover 90 for covering the insertion opening 50*a* by being mounted on the housing body 50.

According to this configuration, the wires 20 can be accommodated in the housing body 50 by mounting the cover 90 on the housing body 50 after the wires 20 are arranged inside the housing body 50 through the insertion opening 50*a*. Therefore, the connector 10 can be easily assembled.

(6) The housing 40 includes the retainer 80 to be mounted on the outer surface of the housing body 50. The housing body 50 includes the insertion portion 51, which is open in the Z-axis direction and into which the holder 70 is inserted. The cuts 54 are provided on the opening edge 51*a* of the insertion portion 51. The holder 70 includes the projections 74 to be inserted into the cuts 54 with a play between the cuts 54 and the projections 74. The retainer 80 includes the restricting portion 83 for closing the cuts 54 and restricting the separation of the projections 74 from the cuts 54 by contacting the opening edge 51A.

According to this configuration, the separation of the holder 70 from the housing body 50 is restricted by mounting the retainer 80 on the outer surface of the housing body 50 with the projections 74 of the holder 70 inserted in the cuts 54 of the housing body 50. In this way, the holder 70 configured to be swingable with respect to the housing body 50 can be easily realized.

(7) The connector 10 includes the plurality of terminals 30 and the plurality of wires 20 to be connected to the respective terminals 30. The holder 70 is configured to collectively hold the plurality of terminals 30 and be swingable in the plane direction together with the plurality of terminals 30 with respect to the housing body 50.

According to this configuration, the plurality of terminals 30 are collectively held in the holder 70. Thus, changes in relative positions of the terminals 30 can be suppressed inside the holder 70. Therefore, the plurality of terminals 30 can be easily connected to the mating connector 200.

(8) The plurality of wires 20 are arranged in the X-axis direction inside the housing body 50.

According to this configuration, an increase in the size of the connector 10 in the Z-axis direction can be suppressed as compared to the case where the plurality of wires 20 extend in a direction intersecting the Z-axis direction and are arranged in the Z-axis direction.

(9) The connector 10 is fixed to the case 110 of the device to constitute the device together with the case 110. The housing body 50 includes the fixing portions 60 to be fixed to the case 110. The fixing portion 60 includes the bolt hole 63 penetrating through the fixing portion 60 in the Z-axis direction.

According to this configuration, the bolt hole 63 of the fixing portion 60 penetrates through the fixing portion 60 in the Z-axis direction orthogonal to the X-axis direction. Thus, an increase in the size of the fixing portion 60 in the Z-axis direction can be suppressed, for example, as compared to the case where the bolt hole 63 penetrates through the fixing portion 60 in the X-axis direction, which is an arrangement direction of the plurality of wires 20. Therefore, an increase in the size of the connector 10 in the Z-axis direction can be suppressed.

(10) The connector 10 includes the band members 100 for fastening the second accommodating portions 58 and the second cover portions 92.

For example, if a part extending to the outside of the housing 40, out of the wire 20, is bent, the second cover portion 92 is deformed in a direction away from the second accommodating portion 58 as the wire 20 is bent, whereby a distance between the second accommodating portion 58 and the second cover portion 92 may increase. In this case, a load may be applied to the terminal 30 due to an increase in the bending amount of the wire 20 inside the housing 40.

On this point, according to the above configuration, the separation of the second cover portion 92 from the second accommodating portion 58 can be suppressed by the band member 100. Therefore, the occurrence of the aforementioned inconvenience can be suppressed.

<Modification>

This embodiment can be modified and carried out as follows. This embodiment and the following modifications can be carried out in combination without technically contradicting each other.

- A penetration direction of the bolt hole 63 through the fixing portion 60 can be appropriately changed according to the mounting direction of the connector 10 on the case 110.
- The fixing portions 60 can be omitted from the housing body 50.
- The connector 10 may include one wire 20 and one terminal 30 or three or more wires 20 and three or more terminals 30.
- The retainer 80 can be omitted from the housing 40. In this case, the housing body 50 may include holes penetrating therethrough in the Y-axis direction instead of the cuts 54.
- The cover 90 can be omitted from the housing 40. In this case, the housing body 50 may be, for example, composed of two divided bodies engaged with each other and divided in the X-axis direction.
- The number of the supporting protrusions 58*a* in the second accommodating portion 58 can be appropriately changed.
- The supporting protrusions 58*a* may be provided partly in the extending direction of the second accommodating portion 58.
- The supporting protrusions 58*a* can be omitted from the second accommodating portion 58. In this case, the gaps G1 may not be provided between the second accommodating portion 58 and the wire 20.
- The number of the supporting protrusions 92*a* in the second cover portion 92 can be appropriately changed.
- The supporting protrusions 92*a* may be provided partly in the extending direction of the second cover portion 92.
- The supporting protrusions 92*a* can be omitted from the second cover portion 92. In this case, the gaps G2 may not be provided between the second cover portion 92 and the wire 20.
- The second accommodating portions 58 can be omitted from the housing body 50. In this case, the wires 20 may be supported slidably in the extending direction inside the first accommodating portions 56.
- The wire 20 may be accommodated in a bent state inside the housing body 50. In this case, for example, the second extending portion 34 and the bent portion 36 may be omitted from the terminal 30 and the wire 20 may be connected to the first extending portion 31.

The angle formed between the extending direction of the wire 20 and the Z-axis direction can be appropriately changed in a range where these directions intersect. Note that, in the case of changing the extending direction of the wire 20, it is preferred to change the angle formed between the first and second extending portions 31, 34.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector to be connected to a connection object, comprising:

a flexible wire;

a terminal to be connected to the wire; and a housing for accommodating the wire and the terminal, wherein, when a direction of connection of the connector to the connection object is a connecting direction and a direction along a virtual plane orthogonal to the connecting direction is a plane direction, the housing includes a housing body for accommodating the wire and a holder for accommodating and holding the terminal, the holder is configured to be swingable in the plane direction together with the terminal with respect to the housing body by being attached to the housing body with a play between the housing body and the holder, the wire extends to outside of the housing body in an extending direction intersecting the connecting direction and is slidable in the extending direction with respect to the housing body, following a swinging motion of the terminal, and a gap for allowing the wire to be bent, following a swinging motion of the terminal, is provided between the housing body and the wire.

2. The connector of claim 1, wherein the terminal includes:

a first extending portion to be electrically connected to the connection object and extending in the connecting direction;

a second extending portion to be electrically connected to the wire and extending in the extending direction; and a bent portion located between the first extending portion and the second extending portion.

3. The connector of claim 1, wherein:

the housing body includes a first accommodating portion provided with the gap and a second accommodating portion for supporting the wire slidably in the extending direction, and the second accommodating portion is provided at a position more away from the holder than the first accommodating portion.

4. The connector of claim 3, wherein:

the second accommodating portion includes a supporting protrusion projecting toward the wire from an inner surface of the second accommodating portion and configured to support the wire slidably in the extending direction.

5. The connector of claim 1, wherein:

the housing body includes an insertion opening open on a side opposite to the holder in the connecting direction and configured to enable insertion of the wire therethrough, and the housing includes a cover for covering the insertion opening by being mounted on the housing body.

6. The connector of claim 1, wherein:

the housing includes a retainer to be mounted on an outer surface of the housing body, the housing body includes an insertion portion open in the connecting direction and configured such that the holder is inserted thereinto, a cut is provided on an opening edge of the insertion portion, the holder includes a projection to be inserted into the cut with a play between the cut and the projection, and the retainer includes a restricting portion for closing the cut and restricting separation of the projection from the cut by contacting the opening edge.

7. The connector of claim 1, comprising:

a plurality of the terminals; and a plurality of the wires to be respectively connected to the terminals, wherein the holder is configured to collectively hold the plurality of terminals and be swingable in the plane direction together with the plurality of terminals with respect to the housing body.

8. The connector of claim 7, wherein the plurality of wires are arranged in an arrangement direction orthogonal to both the connecting direction and the extending direction inside the housing body.

9. The connector of claim 8, wherein:

the connector constitutes a device together with a case of the device by being fixed to the case, the housing body includes a fixing portion to be fixed to the case, and the fixing portion includes a bolt hole penetrating through the fixing portion in the connecting direction.

* * * * *